United States Patent
Burns et al.

(10) Patent No.: US 9,672,277 B2
(45) Date of Patent: Jun. 6, 2017

(54) PRESENTING REAL-TIME SEARCH RESULTS

(71) Applicant: Google Inc., Mountain View, CA (US)

(72) Inventors: Brendan D. Burns, Seattle, WA (US); Lorenz Huelsbergen, Lebanon, NJ (US); Jeremy Hylton, Easton, PA (US); Laramie Leavitt, Kirkland, WA (US); Addy Ngan, Sunnyvale, CA (US); Jack W. Menzel, Mountain View, CA (US)

(73) Assignee: Google Inc., Mountain View, CA (US)

(*) Notice: Subject to any disclaimer, the term of this patent is extended or adjusted under 35 U.S.C. 154(b) by 278 days.

(21) Appl. No.: 14/493,048

(22) Filed: Sep. 22, 2014

(65) Prior Publication Data
US 2015/0012518 A1  Jan. 8, 2015

Related U.S. Application Data

(63) Continuation of application No. 12/960,448, filed on Dec. 3, 2010, now Pat. No. 8,843,856.
(Continued)

(51) Int. Cl.
| | |
|---|---|
| *G06F 17/00* | (2006.01) |
| *G06F 17/30* | (2006.01) |
| *H04L 29/06* | (2006.01) |
| *G06F 3/0481* | (2013.01) |
| *G09G 5/08* | (2006.01) |
| *G06F 3/038* | (2013.01) |
| *G06F 3/0484* | (2013.01) |

(52) U.S. Cl.
CPC .. *G06F 17/30684* (2013.01); *G06F 17/30899* (2013.01); *H04L 65/40* (2013.01); *G06F 3/038* (2013.01); *G06F 3/04812* (2013.01); *G06F 3/04817* (2013.01); *G06F 3/04845* (2013.01); *G06F 17/3053* (2013.01); *G06F 17/30554* (2013.01); *G06F 17/30867* (2013.01); *G09G 5/08* (2013.01)

(58) Field of Classification Search
CPC .......... G06F 17/30864; G06F 17/3053; G06F 17/30867; G06F 17/30554; G06F 3/04812; G06F 3/04817; G06F 3/04845; G06F 3/038; G09G 5/08
USPC ......... 715/762, 273, 862; 707/707, 769, 766
See application file for complete search history.

(56) References Cited

U.S. PATENT DOCUMENTS

| | | |
|---|---|---|
| 2007/0078810 A1 | 4/2007 | Hackworth |
| 2008/0065604 A1 | 3/2008 | Tiu et al. |

(Continued)

OTHER PUBLICATIONS

Goel, A., et al. "Real-time Search Going mainstream," Knowledgefaber website, Dec. 9, 2009, [online] [Retrieved on Apr. 15, 2011]. Retrieved from the Internet: <URL: http://knowledgefaber.com/index.php?option=com_content&view=article&ids=37:real-time-search-going-mainstream&catid=14:it-bpo-software-&Itemid=42>, 2 pages.

(Continued)

*Primary Examiner* — Quoc A Tran
(74) *Attorney, Agent, or Firm* — Fish & Richardson P.C.

(57) ABSTRACT

Methods, systems, and apparatus, including computer programs encoded on computer storage media, for presenting real-time search results. In one aspect, a method includes presenting real-time search results in response to a query; and automatically updating the real-time search results.

20 Claims, 2 Drawing Sheets

Related U.S. Application Data

(60) Provisional application No. 61/267,416, filed on Dec. 7, 2009, provisional application No. 61/267,011, filed on Dec. 4, 2009.

(56) References Cited

U.S. PATENT DOCUMENTS

| | | |
|---|---|---|
| 2008/0065701 A1 | 3/2008 | Lindstrom et al. |
| 2008/0104045 A1* | 5/2008 | Cohen ............... G06F 17/30867 |
| 2009/0234815 A1 | 9/2009 | Boerries et al. |
| 2010/0169286 A1 | 7/2010 | Hackworth |
| 2012/0143843 A1 | 6/2012 | Smyth et al. |
| 2012/0311139 A1* | 12/2012 | Brave ............... G06F 17/30867 |
| | | 709/224 |

OTHER PUBLICATIONS

Len, C., "Scooplet.com Real Time Search," Youtube, May 14, 2009 (May 14, 2009), [online] [Retrieved on Apr. 5, 2011]. Retrieved from the Internet: <URL: http://www.youtube.com/watch?v=Fk3SrYNPd2Q>, the whole video, 4 pages.

Screenshot of "Scoopler Revisit," Youtube, XP002633145, [online] [retrieved on Apr. 15, 2011]. Retrieved from the Internet: <URL: http://www.youtube.com/watch?v=Fk3SrYNPd2Q>, 1 page.

Siegler, MG. "Search Goes Real-Time with Scoopler. Twitter Dominates Results," TechCrunch website, May 8, 2009, [online] [Retrieved on May 31, 2011]. Retrieved from the Internet: <URL: http://techcrunch.com/2009/05/08/search-goes-real-time-with-scoopler-twitter-dominates-results/>, 9 pages.

International Search Report and Written Opinion dated Apr. 29, 2011 for PCT/US2010/058994, filed Dec. 3, 2010, 11 pages.

\* cited by examiner

FIG. 2

PRESENTING REAL-TIME SEARCH RESULTS

CROSS-REFERENCE TO RELATED APPLICATIONS

This is a continuation of U.S. application Ser. No. 12/960,448, filed on Dec. 3, 2010, which claims the benefit of priority of U.S. Provisional Application No. 61/267,416, filed on Dec. 7, 2009, and U.S. Provisional Application No. 61/267,011, filed on Dec. 4, 2009. The disclosure of each prior application is considered part of and is incorporated by reference in the disclosure of this application.

BACKGROUND

This specification relates to presenting search results. Search engines aim to identify resources (e.g., images, audio, video, web pages, text, documents) that are relevant to a user's needs and to present information about the resources in a manner that is most useful to the user. Search engines return a set of search results in response to a user submitted query.

SUMMARY

In general, one innovative aspect of the subject matter described in this specification can be embodied in methods that include the actions of presenting real-time search results in response to a query; and automatically updating the real-time search results. Other embodiments of this aspect include corresponding systems, apparatus, and computer programs recorded on computer storage devices, each configured to perform the actions of the methods.

These and other embodiments can each optionally include one or more of the following features, alone or in combination. Presenting the real-time search results includes presenting the real-time search results along with other search results. Updating the real-time search results includes requesting new search results from a search engine backend, receiving the new search results, and presenting the new search results.

In general, another innovative aspect of the subject matter described in this specification can be embodied in methods that include the action of providing from a search system to a user device, in response to a search query received from the user device, a user interface document, the user interface document including two or more search results responsive to the query and device software operable when executed on the client device to present a dynamic real-time search results element, the software operable to cause real-time search results to be displayed in the element. Other embodiments of this aspect include corresponding systems, apparatus, and computer programs recorded on computer storage devices, each configured to perform the actions of the methods.

These and other embodiments can each optionally include one or more of the following features, alone or in combination. The document is an HTML (Hypertext Markup Language) document and the device software is JavaScript code. The JavaScript code is operable to update the displayed document by modifying a DOM (Document Object Model) representation of the document maintained by a web browser running on the user device. The software is further operable to resubmit the query as a resubmitted query to the search system and receive in response further real-time search results from the search system and cause the further real-time search results to be displayed in the element. The software is further operable to determine times for resubmitting the query to the search system. The times are at a regular interval. The times are determined based on information provided by the search system in response to one submission of the query indicating an appropriate time for a subsequent resubmission of the query. The resubmitted query includes data defining a time of most recent result to allow the search system to provide only more recent results as real-time search results. The element separates two of the two or more search results when the document is displayed on the user device. The software is further operable to implement a scroll bar for a user of the device to scroll real-time search results displayed in the element. The user device includes a personal computer, a personal digital assistant, or a mobile telephone.

In general, another innovative aspect of the subject matter described in this specification can be embodied in methods that include the actions of receiving in a user device from a search system, in response to a search query sent to the search system from the user device, a user interface document, the user interface document including two or more search results responsive to the query and device software operable when executed on the client device to present a dynamic real-time search results element, the software operable to cause real-time search results to be displayed in the element; and displaying the document including the search results and the real-time search results in the element. Other embodiments of this aspect include corresponding systems, apparatus, and computer programs recorded on computer storage devices, each configured to perform the actions of the methods.

These and other embodiments can each optionally include one or more of the following features, alone or in combination. The document is an HTML (Hypertext Markup Language) document and the device software is JavaScript code. The actions further include executing the JavaScript code to update the displayed document by modifying a DOM (Document Object Model) representation of the document maintained by a web browser running on the user device. The actions further include executing the software to resubmit the query as a resubmitted query to the search system and receive in response further real-time search results from the search system and cause the further real-time search results to be displayed in the element. The actions further include executing the software to determine times for resubmitting the query to the search system. The times are at a regular interval. The times are determined based on information provided by the search system in response to one submission of the query indicating an appropriate time for a subsequent resubmission of the query. The resubmitted query includes data defining a time of most recent result to allow the search system to provide only more recent results as real-time search results. The actions further include displaying the element between two of the two or more search results on the user device. The actions further include executing the software to implement a scroll bar for a user of the device to scroll real-time search results displayed in the element. The user device includes a personal computer, a personal digital assistant, or a mobile telephone.

In general, another innovative aspect of the subject matter described in this specification can be embodied in methods that include the actions of providing from a search system to a user device, in response to a search query received from the user device, a user interface document, the user interface document including device software operable when executed on the client device to perform operations that include: causing real-time search results to be displayed in the user interface document; and automatically resubmitting the query as a resubmitted query to the search system and receive in response further real-time search results from the search system and cause the further real-time search results to be displayed in the user interface document. Other embodiments of this aspect include corresponding systems, apparatus, and computer programs recorded on computer storage devices, each configured to perform the actions of the methods.

These and other embodiments can each optionally include one or more of the following features, alone or in combination. The document is an HTML (Hypertext Markup Language) document and the device software is JavaScript code. The JavaScript code is operable to update the displayed document by modifying a DOM (Document Object Model) representation of the document maintained by a web browser running on the user device. The software is further operable to determine times for resubmitting the query to the search system. The times are at a regular interval. The times are determined based on information provided by the search system in response to one submission of the query indicating an appropriate time for a subsequent resubmission of the query. The resubmitted query includes data defining a time of most recent result to allow the search system to provide only more recent results as real-time search results. The user device includes a personal computer, a personal digital assistant, or a mobile telephone.

In general, another innovative aspect of the subject matter described in this specification can be embodied in methods that include the actions of receiving in a user device from a search system, in response to a search query sent to the search system from the user device, a user interface document, the user interface document including software operable when executed on the client device to perform operations that include: causing real-time search results to be displayed in the document; and resubmitting the query as a resubmitted query to the search system and receiving in response further real-time search results from the search system; displaying the document including the real-time search results in the document; and executing the software to resubmit the query and displaying the received further real-time search results in the document. Other embodiments of this aspect include corresponding systems, apparatus, and computer programs recorded on computer storage devices, each configured to perform the actions of the methods.

These and other embodiments can each optionally include one or more of the following features, alone or in combination. The document is an HTML (Hypertext Markup Language) document and the device software is JavaScript code. The actions further include executing the JavaScript code to update the displayed document by modifying a DOM (Document Object Model) representation of the document maintained by a web browser running on the user device. The actions further include executing the software to determine times for resubmitting the query to the search system. The times are at a regular interval. The times are determined based on information provided by the search system in response to one submission of the query indicating an appropriate time for a subsequent resubmission of the query. The resubmitted query includes data defining a time of most recent result to allow the search system to provide only more recent results as real-time search results. The user device includes a personal computer, a personal digital assistant, or a mobile telephone.

Particular embodiments of the subject matter described in this specification can be implemented so as to realize one or more of the following advantages. Users can be presented with real-time search results. This gives users the most up to date information on their search queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example search interface presenting real-time search results responsive to a query.

DETAILED DESCRIPTION

Figure 1:
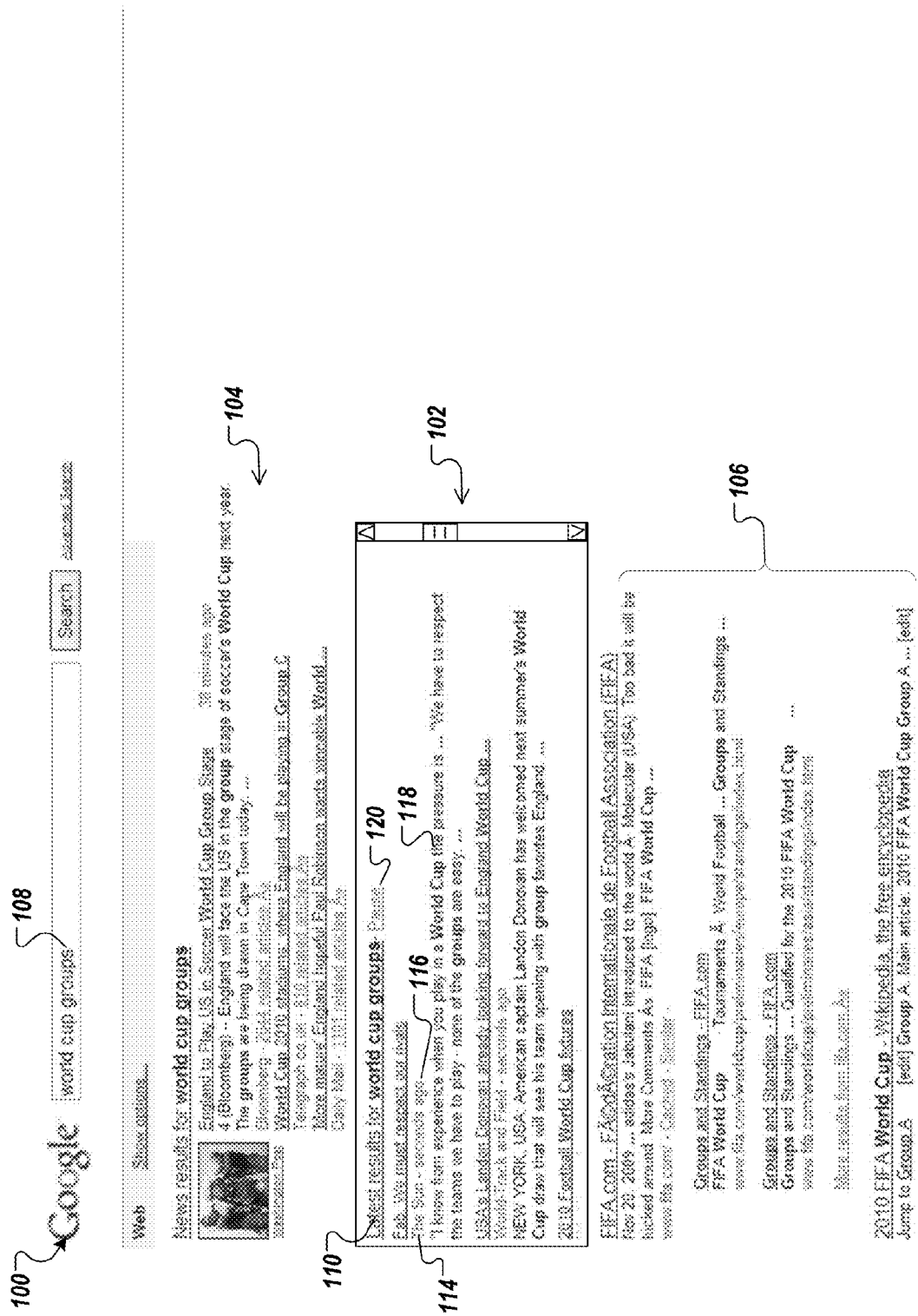
FIG. 1 illustrates an example search interface presenting real-time search results alongside other search results responsive to a query.

FIG. 1 illustrates an example search interface 100 presenting real-time search results 102 alongside other search results 104 and 106 responsive to a query 108. The search interface is presented, for example, by a user device such as a computer, mobile device, or other electronic device.

Real-time search results for a query are search results that are both responsive to the query and relatively recent. For example, real-time search results can be search results for resources that were last updated or uploaded within a threshold amount of time. Example resources include, but are not limited to, websites, blogs, status updates (e.g., tweets from a service such as Twitter or updates from a service such as Facebook), news feeds, images, and videos. Resources can be resources indexed by a search engine or resources received from a provider feed. Example provider feeds include, for example, news feeds, Really Simple Syndication (RSS) feeds, or feeds from content hosting websites, for example, Twitter.com. The threshold can be, for example, ten seconds, one minute, ten minutes, or thirty minutes. The real-time search results can correspond to resources that were updated as recently as a few seconds ago, for example, five seconds before the search results user interface is generated.

For illustrative purposes, the real-time search results 102 are shown in a results box that is in-line with the other search results 104 and 106. A user can use the scroll bar at the right of the box to scroll through the current real-time search results. The real-time search results can also be presented in other configurations; for example, in a separate area of the user interface from the other search results 104 and 106. The search real-time search results 102 can be ordered according to one or more of time (e.g., more recent results first), overall quality of the search results, and relevance of the search results to the user query. Conventional techniques can be used to determine the quality and relevance of the search results.

Each real-time search result includes information about the resource represented by the search result. For example, the real-time search result can include a title for the resource, e.g., title 112, a source, such as a publisher, or any author, for the resource, e.g. source 114, and a time when the resource was last updated, e.g., time 116. The real-time search result can also include one or more snippets of text, e.g., 118, extracted from relevant parts of the resource. The snippets can be extracted, for example, using conventional techniques. Additional examples of real-time search results and the information provided by real-time search results are described below.

The presentation of the real-time search results 102 can be managed, for example, by device software, e.g., a script embedded in a search interface web page, executing on the user device. The software automatically updates the real-time search results without user intervention by periodically submitting queries to a search backend to retrieve the most recent search results responsive to the query. The queries can be submitted according to a pre-defined time schedule, for example, every ten seconds. Alternatively or additionally, the queries can be submitted according to a rate derived from the frequency with which new resources relevant to the query are updated. This frequency information can be received from the search backend. The queries can also be submitted in response to other triggers, for example, a notification received from the server that new relevant real-time search results are available.

For example, the device software can send the query and a time stream identifier to the search backend. The time stream identifier identifies the time of the most recent search result previously sent by the search backend to the software. The search backend uses the provided information to identify new results that have not been presented to the user, and then sends these new results to the software. The device software then presents the newly identified real-time search results to the user, e.g., by adding them to the box 102. The device software adds the results to the box 102 according to the order used to rank the real-time search results. For example, if newer search results are ranked higher than older search results, the newly identified real-time search results can be presented at the top of the box 102. In some implementations, the device software also removes a corresponding number of lowest ranked real-time search results 102, e.g., so that the number of real-time search results does not exceed a maximum number.

A user can stop the updating, for example, by selecting, e.g., with a mouse, keyboard, or other input device, a pause control 120. In response, the device software stops submitting queries to the search engine backend for new search results and does not display new real-time search results to the user. The software can also display an "unpause" control (not shown) that, when clicked by a user, causes the updating to start again.

A user can switch to an interface that presents only real-time search results, and not other search results such as search results 104 and 106 by clicking on the "Latest Results for World Cup Groups" link 110. An example of a user interface that presents just real-time search results is described below with reference to FIG. 2.

The search results 104 and 106 are identified as being responsive to the query, for example, using conventional search techniques and are ranked, for example, using conventional search techniques.

Figure 2:
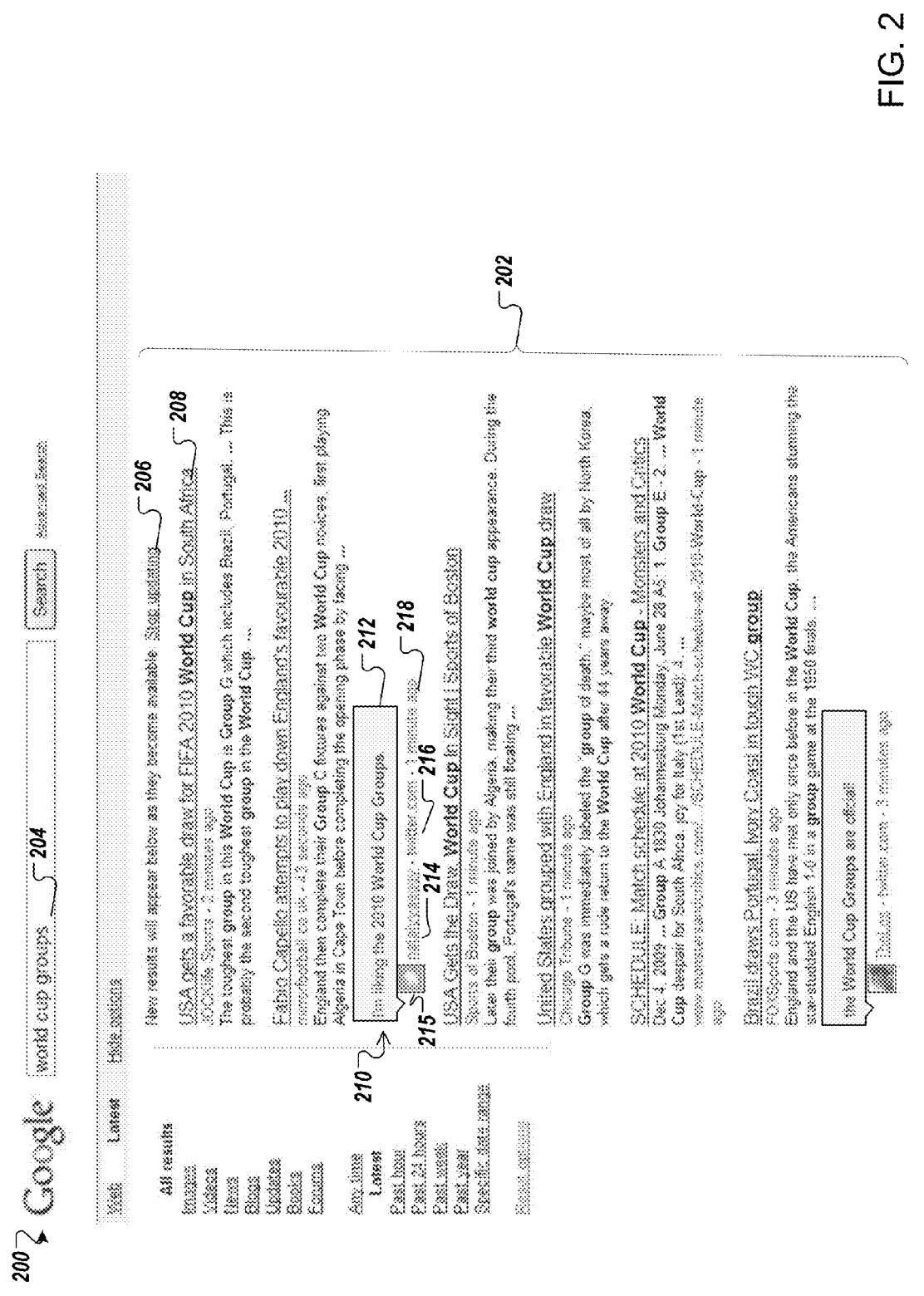

FIG. 2 illustrates an example search interface 200 presenting real-time search results 202 responsive to a query 204. The real-time search results 202 are updated, for example, as described above with reference to FIG. 1. A user can pause the updating by selecting the "stop updating" control 206.

A user can view real-time search results for a different query by submitting a new search query through the user interface.

The real-time search results illustrated in FIG. 2 include search results for web documents, e.g., search result 208, and search results for status updates, e.g., search result 210.

The real-time search results for documents can include title, source, time, and snippets, for example, as described above with reference to FIG. 1.

The real-time search results for status updates include the text of the update, e.g., 212. In some implementations, the text is set off in the user interface. For example, in FIG. 2, the text of the status updates appear in a speech bubble 212. The real-time search results for status updates can also include an identifier of the user who submitted the status update, e.g., 214. This identifier can optionally be a link to the status page of the user. The identifier of the user can also include a picture for the user, e.g., 215, for example, an image associated with the user's profile. The real-time search result can also include the website where the status updates are hosted, e.g., twitter.com 216, and the time when the status update was posted, e.g., time 218. If the status update included a video or an image, a thumbnail image or other representation of the image or video can also be included in the search result.

In some implementations the user interfaces 100 and 200 described above with reference to FIGS. 1 and 2 are adjusted, scaled, or otherwise modified to improve presentation on a mobile device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombinationa. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A method comprising:
receiving, by a search system, a search query from a user device;
obtaining initial real-time search results for the search query, wherein the initial real-time search results are search results for the search query that identify resources that have been recently updated or recently uploaded within a threshold amount of time of the search query being submitted to the search engine; and
in response to the search query, providing from the search system to the user device a response including device software operable when executed on the user device to cause the user device to perform operations comprising:
- displaying the initial real-time search results in a user interface,
- displaying a pause control in the user interface, wherein the pause control, when selected by a user, puts the user interface in a paused state;
- each time that a trigger condition for resubmitting the search query is satisfied and the pause control displayed on the user interface indicates that the user interface is in the paused state:
  - refraining from resubmitting the search query as a resubmitted query to the search system to obtain further real-time search results from the search system; and
- each time that a trigger condition for resubmitting the search query is satisfied and the pause control displayed on the user interface indicates that the user interface is not in the paused state:
  - resubmitting the search query as a resubmitted query to the search system,
  - receiving further real-time search results from the search system in response to the resubmitted query, and
  - displaying the further real-time search results.

2. The method of claim 1, the operations further comprising:
when in the paused state, displaying an unpause control in the user interface, wherein the unpause control, when selected by the user, takes the user interface out of the paused state.

3. The method of claim 1, further comprising:
obtaining search results for the search query, wherein displaying the initial real-time search results comprises displaying the initial real-time search results separately from the search results in the user interface.

4. The method of claim 1, the operations further comprising:
determining that the trigger condition has been satisfied at regular time intervals.

5. The method of claim 1, the operations further comprising:
determining that the trigger condition has been satisfied in response to receiving information provided by the search system indicating an appropriate time for a subsequent resubmission of the query.

6. The method of claim 1, wherein the further real-time search results identify resources that have been updated or uploaded more recently than any resource identified by any real-time search results previously received by the user device.

7. The method of claim 1, the operations further comprising providing, with each resubmitted query, data defining a time of a most recent real-time search result, wherein the most recent real-time search result is a real-time search result identifying a resource that has been updated or uploaded more recently than any resource identified by any other real-time search results previously received by the user device.

8. The method of claim 1, wherein the response is provided in the form of an HTML (Hypertext Markup Language) document and the device software is JavaScript code in the document.

9. The method of claim 8, wherein the JavaScript code is operable to update the document by modifying a DOM (Document Object Model) representation of the document maintained by a web browser running on the user device.

10. A system comprising one or more computers and one or more storage devices storing instructions that when executed by the one or more computers cause the one or more computers to perform first operations comprising:
- receiving a search query from a user device;
- obtaining initial real-time search results for the search query, wherein the initial real-time search results are search results for the search query that identify resources that have been recently updated or recently uploaded within a threshold amount of time of the search query being submitted to the search engine; and
- in response to the search query, providing from the system to the user device a response including device software operable when executed on the user device to cause the user device to perform second operations comprising:
  - displaying the initial real-time search results in a user interface,
  - displaying a pause control in the user interface, wherein the pause control, when selected by a user, puts the user interface in a paused state;
  - each time that a trigger condition for resubmitting the search query is satisfied and the pause control displayed on the user interface indicates that the user interface is in the paused state:
    - refraining from resubmitting the search query as a resubmitted query to the search system to obtain further real-time search results from the search system; and
  - each time that a trigger condition for resubmitting the search query is satisfied and the pause control displayed on the user interface indicates that the user interface is not in the paused state:
    - resubmitting the search query as a resubmitted query to the search system,
    - receiving further real-time search results from the search system in response to the resubmitted query, and
    - displaying the further real-time search results.

11. The system of claim 10, the second operations further comprising:
when in the paused state, displaying an unpause control in the user interface, wherein the unpause control, when selected by the user, takes the user interface out of the paused state.

12. The system of claim 10, the first operations further comprising:
obtaining search results for the search query, wherein displaying the initial real-time search results comprises displaying the initial real-time search results separately from the search results in the user interface.

13. The system of claim 10, the second operations further comprising:
determining that the trigger condition has been satisfied at regular time intervals.

14. The system of claim 10, the second operations further comprising:
determining that the trigger condition has been satisfied in response to receiving information provided by the system indicating an appropriate time for a subsequent resubmission of the query.

15. The system of claim 10, wherein the further real-time search results identify resources that have been updated or uploaded more recently than any resource identified by any real-time search results previously received by the user device.

16. The system of claim 10, the second operations further comprising providing, with each resubmitted query, data defining a time of a most recent real-time search result, wherein the most recent real-time search result is a real-time search result identifying a resource that has been updated or uploaded more recently than any resource identified by any other real-time search results previously received by the user device.

17. The system of claim 10, wherein the response is provided in the form of an HTML (Hypertext Markup Language) document and the device software is JavaScript code in the document.

18. The system of claim 17, wherein the JavaScript code is operable to update the document by modifying a DOM (Document Object Model) representation of the document maintained by a web browser running on the user device.

19. A non-transitory computer-readable storage medium encoded with a computer program, the computer program comprising instructions that when executed by one or more computers cause the one or more computers to perform first operations comprising:
    receiving, by a search system, a search query from a user device;
    obtaining initial real-time search results for the search query, wherein the initial real-time search results are search results for the search query that identify resources that have been recently updated or recently uploaded within a threshold amount of time of the search query being submitted to the search engine; and
    in response to the search query, providing from the search system to the user device a response including device software operable when executed on the user device to cause the user device to perform second operations comprising:
        displaying the initial real-time search results in a user interface,
        displaying a pause control in the user interface, wherein the pause control, when selected by a user, puts the user interface in a paused state;
        each time that a trigger condition for resubmitting the search query is satisfied and the pause control displayed on the user interface indicates that the user interface is in the paused state:
            refraining from resubmitting the search query as a resubmitted query to the search system to obtain further real-time search results from the search system; and
        each time that a trigger condition for resubmitting the search query is satisfied and the pause control displayed on the user interface indicates that the user interface is not in the paused state:
            resubmitting the search query as a resubmitted query to the search system,
            receiving further real-time search results from the search system in response to the resubmitted query, and
            displaying the further real-time search results.

20. The non-transitory computer-readable storage medium of claim 19, the second operations further comprising:
    when in the paused state, displaying an unpause control in the user interface, wherein the unpause control, when selected by the user, takes the user interface out of the paused state.

* * * * *